US006975203B2

(12) United States Patent
Brookbank et al.

(10) Patent No.: US 6,975,203 B2
(45) Date of Patent: Dec. 13, 2005

(54) UNIVERSAL BARRIER OPERATOR TRANSMITTER

(75) Inventors: Thomas A. Brookbank, Chicago, IL (US); James J. Fitzgibbon, Batavia, IL (US); Edward T. Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 290 days.

(21) Appl. No.: 10/164,692

(22) Filed: Jun. 6, 2002

(65) Prior Publication Data

US 2003/0227370 A1 Dec. 11, 2003

(51) Int. Cl.[7] .......................... G06K 19/00; G05B 19/00; E05F 15/20

(52) U.S. Cl. .......................... 340/5.26; 340/5.71; 49/25

(58) Field of Search .......................... 340/5.26, 5.7, 340/5.71, 825.69, 825.72; 49/17, 25, 26

(56) References Cited

U.S. PATENT DOCUMENTS 4,367,470 A 1/1983 Tadokoro et al.
4,641,458 A * 2/1987 Pilcher et al. .................. 49/18
5,489,827 A * 2/1996 Xia .............................. 315/294
5,969,637 A * 10/1999 Doppelt et al. ......... 340/825.69
6,111,374 A 8/2000 Fitzgibbon et al.
6,120,262 A 9/2000 McDonough et al.
6,243,000 B1 6/2001 Tsui
6,624,605 B1 * 9/2003 Powder et al. .............. 318/445
2003/0159355 A1 * 8/2003 Froerer et al. ............... 49/74.1

OTHER PUBLICATIONS

Search Report for PCT patent application PCT/US03/17876 mailed Sep. 25, 2003.

* cited by examiner

*Primary Examiner*—Brian Zimmerman
*Assistant Examiner*—Clara Yang
(74) *Attorney, Agent, or Firm*—Fitch, Even, Tabin & Flannery

(57) ABSTRACT

In a multiple barrier movement operator environment, one switch module for controlling all of the barrier movement operators. The switch module may be wall mounted for convenience and communicates with the barrier operator either wirelessly or through a wired interface. The switch module controls and operates movement of any barrier singly while controlling the operation of the overhead lights and response inhibit modes of all the barrier operators. A stop button also maybe provided to enable all the barrier operators to discontinue movement of their respective barriers.

22 Claims, 9 Drawing Sheets

ONE GDO THREE BUTTON

| | | | | | | | | | | | | | | | | ID2 | ID1 | ID0 | S0 | |
|---|---|---|---|---|---|---|---|---|---|---|---|---|---|---|---|---|---|---|---|---|
| X | X | X | X | X | X | X | X | X | X | X | X | X | X | X | X | 1 | 2 | 0 | 0 | COMMAND 1 |
| X | X | X | X | X | X | X | X | X | X | X | X | X | X | X | X | 1 | 2 | 0 | 1 | LIGHT TOGGLE |
| X | X | X | X | X | X | X | X | X | X | X | X | X | X | X | X | 1 | 2 | 0 | 2 | LOCK TOGGLE |

LIGHT--COMMAND
LOCK--COMMAND
LIGHT--LOCK

LEARN TX PER ID TYPE
LEARN OCS TX
LEARN LIGHT TX

SINGLE ROLL FOR ALL BUTTONS--DOES NOT CHANGE FOR MULTI-BUTTON

*Fig. 8*

FOUR GDO NINE BUTTON

| | | | | | | | | | | | | | | | S1 | ID2 | ID1 | ID0 | S0 | |
|---|---|---|---|---|---|---|---|---|---|---|---|---|---|---|---|---|---|---|---|---|
| X | X | X | X | X | X | X | X | X | X | X | X | X | X | X | 0 | 1 | 2 | 1 | 0 | COMMAND 1 |
| X | X | X | X | X | X | X | X | X | X | X | X | X | X | X | 0 | 1 | 2 | 1 | 1 | COMMAND 2 |
| X | X | X | X | X | X | X | X | X | X | X | X | X | X | X | 0 | 1 | 2 | 1 | 2 | COMMAND 3 |
| X | X | X | X | X | X | X | X | X | X | X | X | X | X | X | 1 | 1 | 2 | 1 | 0 | COMMAND 4 |
| X | X | X | X | X | X | X | X | X | X | X | X | X | X | X | 1 | 1 | 2 | 1 | 1 | LIGHT ON |
| X | X | X | X | X | X | X | X | X | X | X | X | X | X | X | 1 | 1 | 2 | 1 | 2 | LIGHT OFF |
| X | X | X | X | X | X | X | X | X | X | X | X | X | X | X | 2 | 1 | 2 | 1 | 0 | LOCK ON |
| X | X | X | X | X | X | X | X | X | X | X | X | X | X | X | 2 | 1 | 2 | 1 | 1 | LOCK OFF |
| X | X | X | X | X | X | X | X | X | X | X | X | X | X | X | 2 | 1 | 2 | 1 | 2 | STOP |

LIGHT ON--COMMAND X
LOCK ON--COMMAND X
LIGHT ON--LOCK ON
LIGHT ON--LOCK ON--COMMAND X

LEARN TX PER ID TYPE--SINGLE GDO
LEARN OCS TX--SINGLE GDO
LEARN LIGHT TX--ALL GDO's
LEARN LIGHT TX--SINGLE GDO's

SINGLE ROLL FOR ALL BUTTONS--DOES NOT CHANGE FOR MULTI-BUTTON

*Fig. 9*

UNIVERSAL BARRIER OPERATOR TRANSMITTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A COMPUTER PROGRAM LISTING APPENDIX ON A COMPACT DISC

The computer program listing appendix contained within file "WWC_RX.TXT", "WWC3_BUT.TXT" and "WWC9_BUT.TXT" on compact disc "1 of 1", which has been filed with the United States Patent and Trademark Office in duplicate, are hereby incorporated herein by reference. These files were created on Jun. 5, 2002, and are 181 KB, 30 KB and 31 KB, respectively in size.

FIELD OF THE INVENTION

The present invention relates generally to barrier movement operators and, more specifically, to a barrier movement operator switch unit for controlling multiple barrier operators.

BACKGROUND OF THE INVENTION

Over the years there has been an increasing trend in the housing market to construct homes having three- or four-car garages. Business, particularly automobile repair shops, have for many years used multiple garage door configuration. In many instances, either for reasons of aesthetics or practicality, the garages have multiple independent doors generally corresponding to the number of cars that may be housed within the garage. Each door, therefore, requires its own barrier movement operator, or garage door opener (GDO). Presently, a homeowner or business owner is required to install each GDO as a separate unit, with each unit having its own switch module for controlling the opening and closing of the door and for controlling other features such as enabling or disabling a signal response inhibit feature, also referred to as vacation mode or lock mode, for preventing hand-held transmitters from controller the barrier operator or turning the GDO overhead light off and on. Therefore, for example, in a home having a three-car garage with three independent doors and accordingly three GDOs, three different wall units are required for controlling the GDOs.

If the owner of a dwelling having multiple operators needs to turn on the overhead light for each GDO in the garage, he is required not only to press the light button on the first switch module, but the second and third or more overhead light buttons on each switch module to turn on all the lights. Similarly, a homeowner wanting to set each GDO to response inhibit mode must manually program each GDO one at a time. To shut off the overhead lights or to turn off response inhibit mode on each GDO, the homeowner reverses the above process and manually turns off each of the overhead lights and/or disables response inhibit mode on each GDO one at a time.

What is needed, therefore, is one or more switch modules capable of controlling the movement of the multiple barrier operators independently and a user accessible control switch also capable of enabling and disabling one or more convenience features for all the operators.

SUMMARY OF THE INVENTION

In accordance with the present invention, multiple barrier movement operators are provided in communication with one switch module for controlling all of the operators. The switch module may be wall mounted for convenience and communicates with the barrier operators either wirelessly or through a wired interface. In situations where a homeowner or business owner uses multiple garage doors, each door generally requires its own movable barrier operator and is controlled from a single switch module. Advantageously, the switch module controls and operates movement of any barrier singly and also controls the overhead lights and response inhibit modes of all the barrier operators.

A particular advantage of using one switch module is that the user now has the ability to turn on or off all the overhead lights in all the barrier operators with the push of a single button. Similarly, the switch module is used to activate or deactivate response inhibit mode in all of the barrier operators as well, again with the push of a single button. In another embodiment, the switch module includes a stop button for stopping any and all operators in motion with a single press of a button. Thus, a user in an emergency situation is not required to fumble for the button corresponding to each door in motion, but rather is able to quickly locate and press a single button to stop operation of all barrier operators.

These and other advantages are realized with the described multiple barrier operator switch module system. The advantages maybe best understood from the following description considered in conjunction with the accompanying drawings and with the computer program listing appendix, which describes the programming of the various switch modules processors.

BRIEF DESCRIPTION OF THE DRAWINGS

Other objects and advantages of the invention will become apparent upon reading the following detailed description and upon reference to the drawings, in which:

FIG. 8 is the code format for the 3-button switch module;

FIG. 9 is the code format for the 9-button switch module; and

DESCRIPTION

Figure 1:
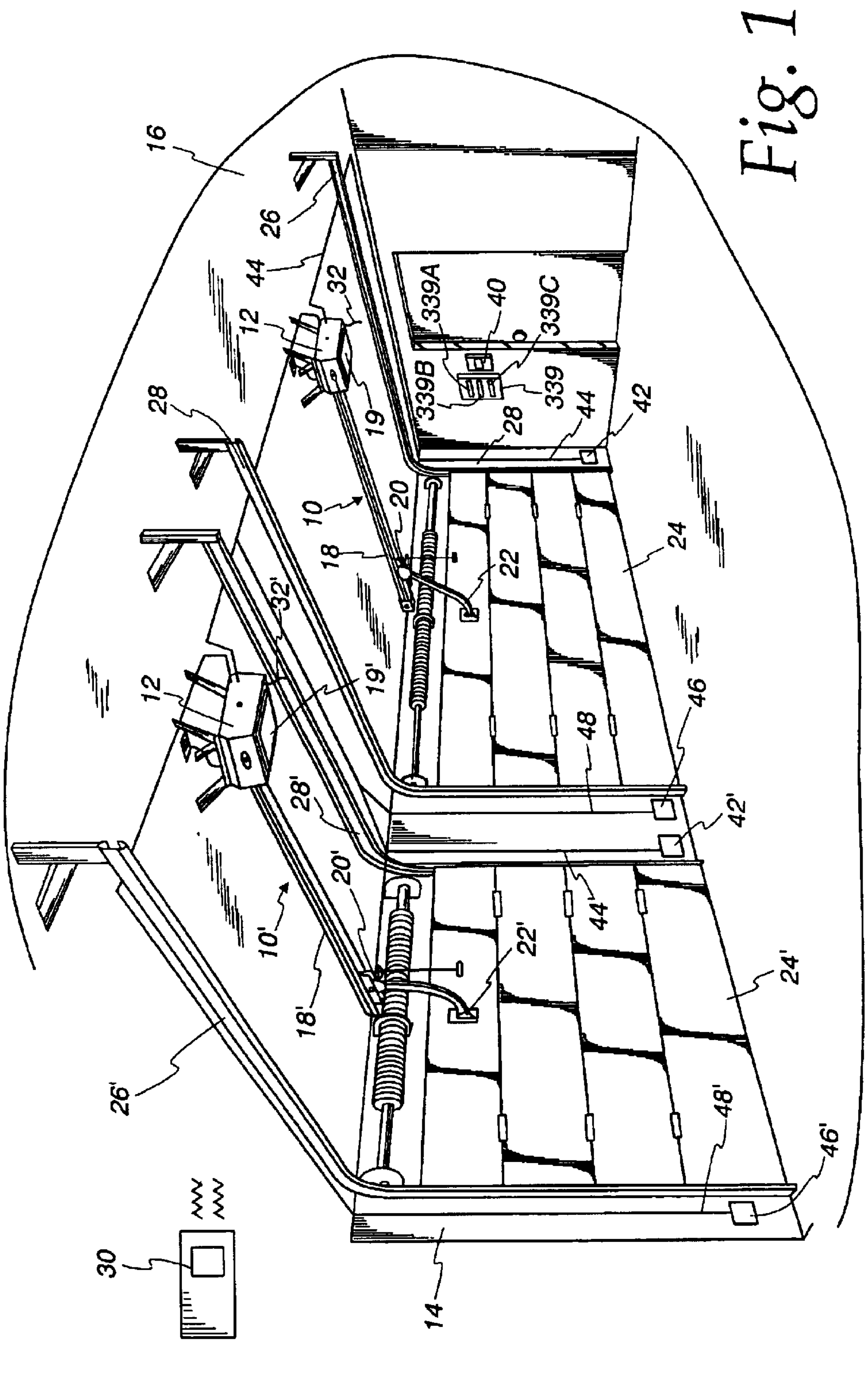
FIG. 1 is a perspective view of a garage door operating system in accordance with an embodiment of the invention.

Referring now to the drawings and particularly FIG. 1, a pair of movable barrier operators 10, 10' including head units 12, 12' mounted within a garage 14 and employed for controlling the opening and closing of the garage doors 24, 24' is generally shown therein. It is to be noted that for the purposes of discussion, only two movable barrier operators are shown and described in FIG. 1. However, additional barrier operators also maybe employed as is illustrated in other embodiments.

Figure 2:
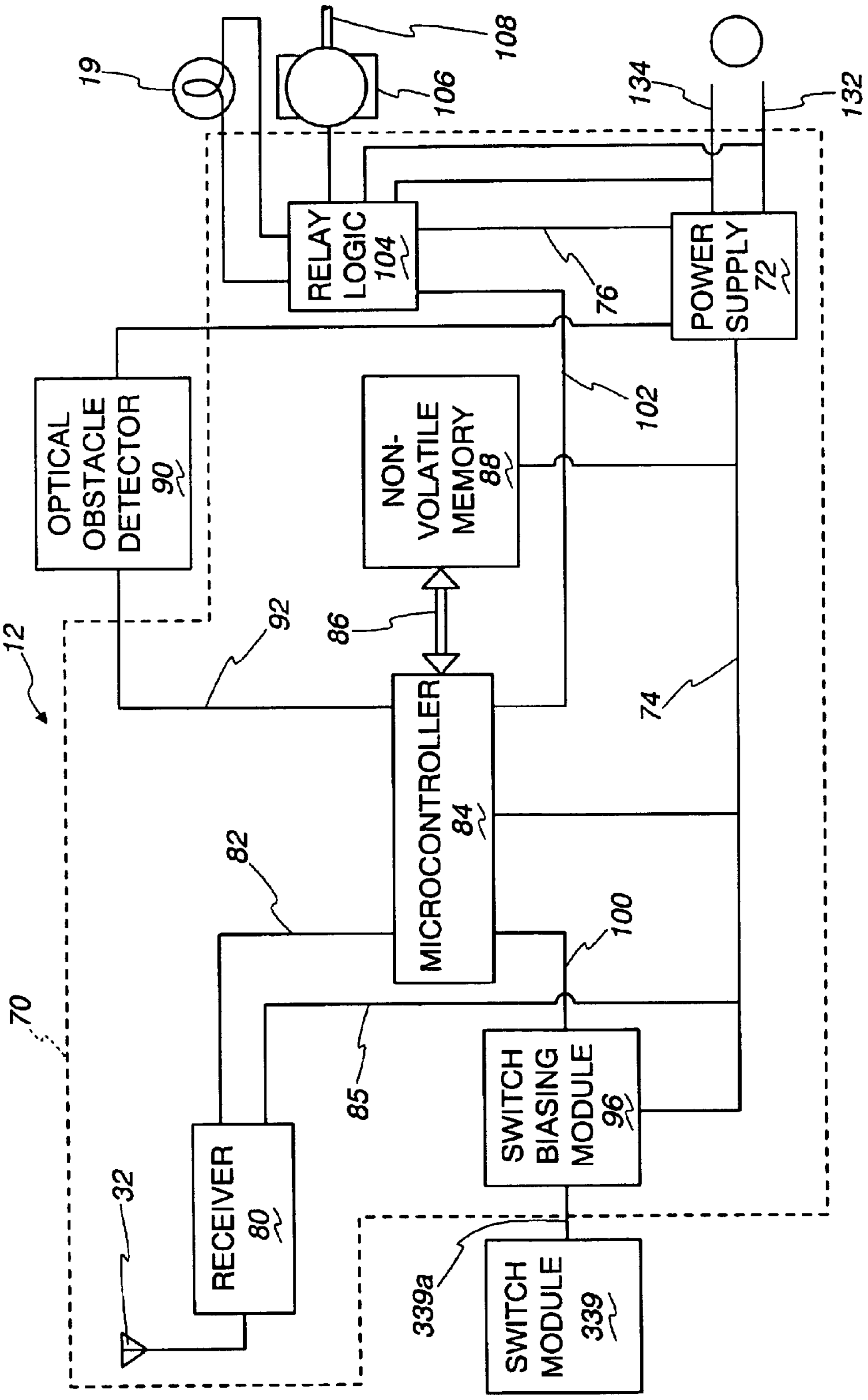
FIG. 2 is a block diagram of a controller mounted within the head unit of the garage door operator employed in the garage door operator shown in FIG. 1.

Referring to FIGS. 1 and 2, the head units 12, 12' are mounted to the ceiling 16 of the garage 14. Each head unit 12, 12' includes a motor 106 and a controller 70 for controlling electrical power supplied to the motor 106 through relay logic 104. The controller 70 for the movable barrier operator 10 responds to various inputs by starting and stopping the motor 106, which is used to move the barrier and by turning a light 19 on and off. In the course of this description the phrase directing barrier control includes barrier movement, light control and other functions performed by the barrier operator.

Extending from the head units 12, 12' are rails 18, 18', each having a releasable trolley 20, 20' attached thereto and arm 22, 22' extending from each trolley 20, 20' to a pair of multiple paneled garage doors 24, 24' positioned for movement along a pair of door rails 26, 26' and 28, 28'. The movable barrier operators 10, 10' transfer the garage doors 24, 24' between open and closed positions for allowing access to and from the garage 14.

For safety purposes, optical emitters 42, 42' and optical detectors 46, 46' are provided. These are coupled to the head units 12, 12' by a pair of wires 44, 44' and 48, 48', respectively. The emitters 42, 42' and detectors 46, 46' are used to provide safety of operation in barrier movement. To provide such safety of operation, the controller responds to the emitter and detector and will reverse and open the door in order to prevent damage to property and injury to persons if an obstruction is sensed in the doorway.

There is further included at least one hand-held transmitter unit 30 adapted to send signals to the antennas 32, 32' positioned on or extending from each head unit 12, 12'. The antennas 32, 32' are coupled to their respective receivers located within the head units 12, 12'. A switch module 339, which maybe a three-button 39 (FIG. 3) or nine-button 139 (FIG. 4) module capable of controlling multiple barrier movement operators 10, 10', as further described in detail below, is mounted on a wall of the garage 14. During programming of the switch module 339, the controller 70 in each head unit 12, 12' determines whether the installed switch module 339 is the nine or the three-button switch module. In the embodiment shown in FIG. 1, the switch module 339 communicates with the head units 12, 12' through a wired means of communication. In a wired link, the switch module 339 is physically wired to each installed head unit 12, 12' and communicates with each head unit 12, 12' using any commonly known method of communication, including serial communication. In another embodiment, as discussed below, the switch module communicates with the head units 12, 12' using wireless signals, such as radio frequency (RF) or infrared.

A motion detector 40 is provided for detecting movement inside the garage 14. Unlike an obstacle detector that detects a break in an optical beam transmitted between the optical emitters 42, 42' and the optical detectors 46, 46', the motion detector 40 may be a passive infrared (PIR) detector, ultrasonic, or other device that is capable of detecting either body heat or motion, without requiring a beam to be broken. The motion detector 40 also may be wired or wireless. The motion detector 40, in a wired configuration, is connected to the controller 70 using either the same wires as used by a wired switch module, or by a separate set of wires connected to the controller 70. In a wireless configuration, the motion detector 40 includes a transmitter and communicates with the controller 70 via the receiver 80 and antenna 32. It is to be noted that the motion detector 40 is capable of operating in a mixed mode environment. For example, the motion detector 40, either in a wired or wireless configuration, is able to communicate with the controller 70 regardless of whether the switch module 339 is connected to the controller 70 in a wired or wireless configuration.

The motion detector 40 transmits a signal instructing the controller 70 to either illuminate or turn off the overhead light. Advantageously, in a wireless configuration, the motion detector maybe located anywhere inside the garage. The transmitted signal from the motion detector 40 is the same as that transmitted by any other wireless controller, such as the wireless switch modules 39, 139, and maybe integrated in the wireless switch module.

For security purposes, a signal response inhibit feature, referred to commonly as vacation or lock mode, is provided in the barrier operator such that the controller ignores or inhibits barrier operator response to switch commands from any handheld transmitter, such as hand-held transmitter 30 from opening the barrier. Setting and disabling the inhibit feature is possible only using codes from the switch module 339. When a code is detected and then subsequently determined as not having been sent by the switch module 339, the microcontroller 84 checks whether a response inhibit flag is set in the controller memory indicating that the system is in response inhibit or lock mode. If the response inhibit flag is set, the received code is ignored and the barrier is not moved unless a code or command is received from the switch module 339 instructing the barrier to exit lock mode or to move the barrier to a specific location such as the up limit.

An additional security/convenience feature is the provision of overhead lights 19, 19'. The head units 12, 12' include overhead lights 19, 19' for illuminating the interior of the garage in which the head units 12, 12' are located. The lights 19, 19' are activated or deactivated either by pressing the appropriate switch on the switch module 339 or by breaking the optical beam that runs between the optical emitters 42, 42' and the optical detectors 46, 46'.

Referring now in particular to FIG. 2, it is to be noted that for ease of discussion, only a single representative head unit 12 is shown and described. Additional head units 12', 12" also maybe used as shown in FIG. 1. The head unit 12 includes a controller 70 having an antenna 32. The controller 70 includes a power supply 72 that receives alternating current from an alternating current source, such as 110 volt AC, and converts the alternating current to +5 volts zero and 24 volts DC. The 5 volt supply is fed along a line 74 to a number of other elements in the controller 70. The 24 volt supply is fed along the line 76 to other elements of the controller 70. The controller 70 includes a receiver 80 coupled via a line 82 to supply demodulated digital signals to a microcontroller 84. The receiver 80 is energized by a line 85 coupled to the line 74. Signals may be received by the controller 70 at the antenna 32 and fed to the receiver 80.

The microcontroller 84 is coupled by a bus 86 to a non-volatile random access memory (NVRAM) 88, which stores data related to the operation of the controller 70. An obstacle detector 90, which comprises the optical emitter 42 and the optical detector 46 and their associated wiring 48, is coupled via an obstacle detector bus 92 to the microcontroller 84. The wall switch 339 is connected via the connecting wire 339*a* to a switch biasing module 96 that is powered from the 5 volt supply line 74 and supplies signals to and is controlled by the microcontroller 84 a bus 100 coupled to the microcontroller 84. The microcontroller 84 in response to switch closures, sends signals over a relay logic line 102 to a relay logic module 104 connected to an alternating current motor 106 having a power take-off shaft 108 coupled to the transmission 18 of the garage door operator.

Figure 3:
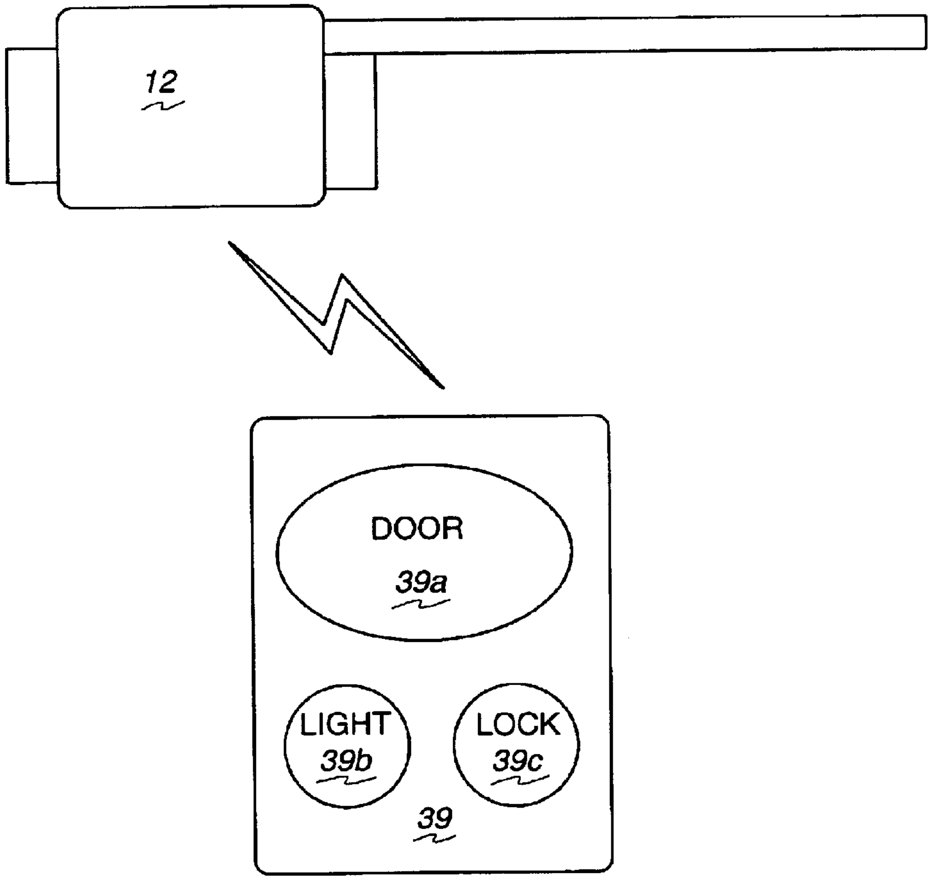
FIG. 3 is a perspective view of a 3-button switch module in accordance with an embodiment of the invention.

Referring to FIG. 3, the switch module 339 of FIG. 1 is shown configured as a three-button wireless switch module 39 in communication with the head unit 12 for controlling operation of the barrier operator 10. Signals transmitted by the three-button wireless switch module 39 are sent to the head unit 12 for processing by the controller 70 (FIG. 2). The three-button wireless switch module 39 includes at least three switches or buttons for controlling the various operations of the barrier operator. The first switch 39*a* is the command switch for controlling barrier movement. The second switch 39*b* toggles the overhead light of the barrier operator and the third switch 39*c* toggles response inhibit mode.

Pressing the first switch 39*a*, when the barrier or garage door is down, causes the barrier operator to lift the door. Conversely, pressing the first switch 39*a* when the barrier is up, causes the operator to lower the door. For safety purposes, breaking the optical beam that runs between the optical emitter 42, 42' (FIG. 1) and the optical detector 46, 46' (FIG. 1) overrides the press of the first switch 39*a* and causes the door to stop or reverse direction. As mentioned above, the second switch 39*b* toggles the overhead barrier light between off and on states and the third switch 39*c* toggles response inhibit mode between an active and inactive state. To notify a user that the barrier operator is in response inhibit mode, the barrier operator lights maybe configured to blink when the third switch 39*c* is pressed and the barrier operator transitions from non-response inhibit mode to response inhibit mode. Whenever the barrier operator is in the response inhibit mode and a learned but inhibited signal is received, the barrier operator light maybe configured to blink to remind the user that the operator is in the response inhibit mode.

The code format for the three-button wireless switch module 39 is illustrated in FIG. 8. For enhanced security, twenty trinary bits (trits) are provided in the three-button wireless switch module. A trinary bit is a three state bit that may be equal to zero, one or two. Of the twenty trits, sixteen trits are reserved for creating a relatively secure and unique switch module code. Advantageously, over 43 million possible switch module codes are possible for enabling the three-button wireless switch module 39 to uniquely identify itself to the head unit 12. One trit is used to identify the activated switch. The remaining three trits are used to identify the transmission as originating from a three-button wireless switch module 39. Each button of a given switch module corresponds to a code that uses the same switch module code with different switch IDs to identify the activated switch or button. In operation, when a user presses a button on the three-button wireless switch module 39, a twenty trit signal is transmitted bearing the unique switch module code of the three-button wireless switch module 39, the type of transmitter used and the identity of the pressed button. A barrier operator trained to respond to this particular switch module receives the signal and executes the button function.

Figure 4:
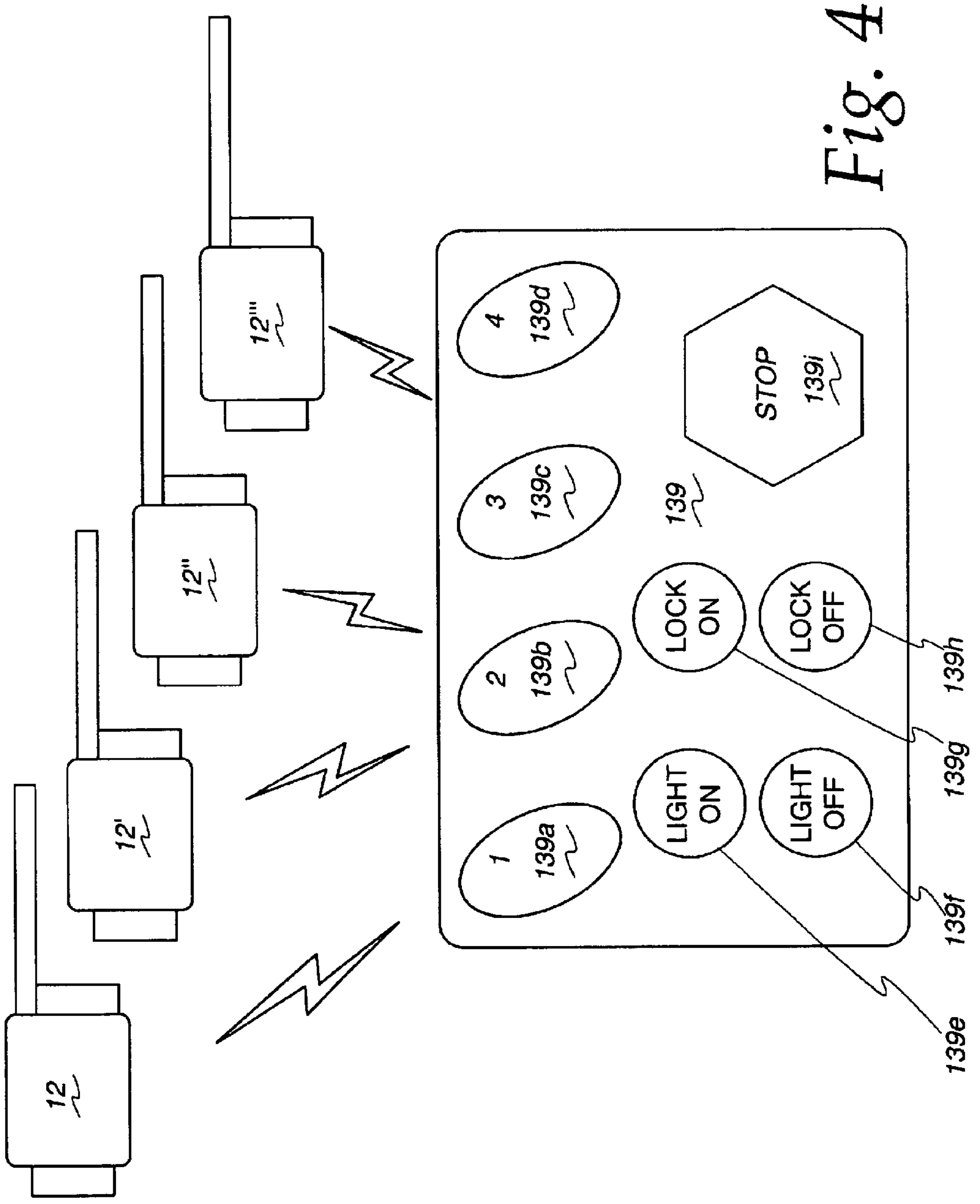
FIG. 4 is a perspective view of a 9-button switch module in accordance with an embodiment of the invention.

Referring to FIG. 4, the nine-button switch module 139 is shown in a wireless configuration. The nine-button wireless switch module 139 operates in a manner similar to that of the three-button wireless switch module and is used for controlling multiple barrier operators and their convenience features, including response inhibit mode and overhead lighting. The nine-button wireless switch module 139 includes eight switches or buttons for controlling the various operations of the barrier operators 12', 12", 12"'. An additional ninth switch is provided for disabling movement of all the barriers using a single button press.

Four command switches 139*a*–139*d* individually control barrier movement for up to four barrier operators in combination (or alone) as previously learned by the operators 12, 12', 12",12"'. The fifth and sixth switches 139*e*, 139*f* turn the overhead lights on and off, respectively. The seventh and eight switches 139*g*, 139*h* turn response inhibit mode on and off, respectively. The ninth switch 139*i* stops all barrier movement for all of the barrier movement operators.

Turning now to FIG. 9, the code format for the nine-button switch module is illustrated. As shown, twenty trinary bits (trits) are provided in the nine-button wireless switch module. Fifteen of the twenty trits make up a serial number or switch module code that is unique to transmitting switch modules. Two trits are used to identify the particular button that is pressed. The remaining three trits are used to identify the transmitter as the nine-button type. The command switch, for example, which corresponds to switch 139*a* of FIG. 4, transmits a particular switch ID that corresponds to the setting of the two trits, S1, S0. The three trits ID2, ID1, ID0 identify the type of transmitter sending the signal, such as the nine-button switch module. Signals sent by a given wireless switch module 139 include the same fifteen trit switch module code, but different two trit button IDs, depending on the particular button pressed. Thus, in operation when a user presses a button on the nine-button switch module, a twenty tit signal is transmitted bearing the switch module code of the nine-button wireless switch module 139, the type of transmitter and the identity of the pressed button. A barrier operator trained to recognize the transmitted signal receives the signal and executes the function associated with the button.

Figure 10:
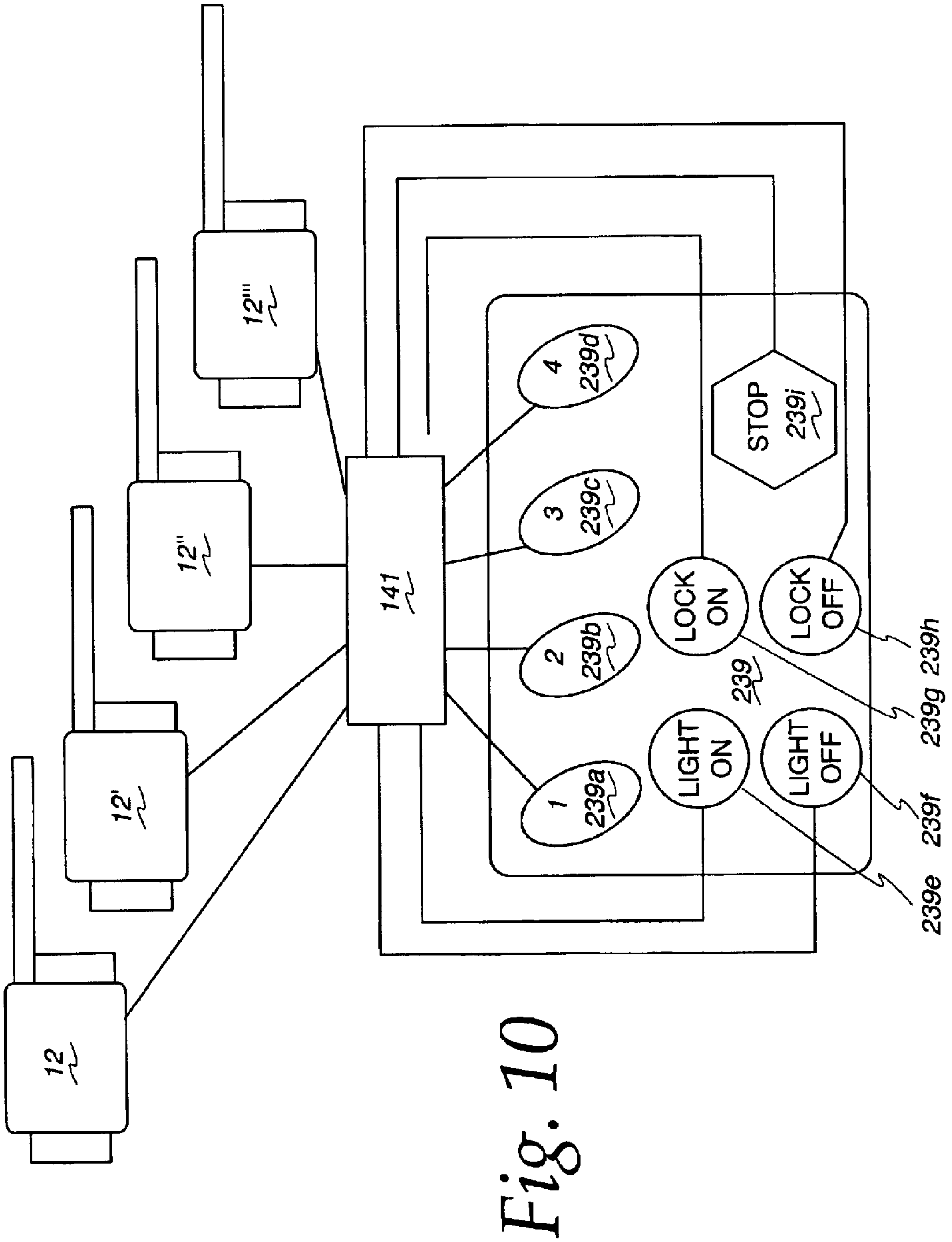
FIG. 10 is a block diagram of a 9-button wired version of the present system.

FIG. 10 shows an exemplary embodiment of a nine-button switch module 239 in a wired configuration. As illustrated, the switch module 239 is in communication with a plurality of head units 12, 12', 12", 12"'. Specifically, the first command switch 239*a* controls operation of the first head unit 12, the second command switch 239*b* similarly controls the second head unit 12', the third command switch 239*c* controls the third head unit 12" and the fourth command switch controls the fourth head unit 12"'.

The switches 239*a*, 239*b*, 239*c*, 239*d* first are routed through a hardware or software based switch module controller 141 that is preferably located within the switch module 239. The switch module controller 141 mediates commands between the switch module 239 and the head units 12, 12', 12",12"'. In particular, the switch module controller 141 routes signals from the switches to barrier operators for which the button press was intended. Thus, when a first switch, or command switch, is pressed instructing the barrier to open, the switch module controller 141 receives the signal and routes it to the first head unit 12. The signals generated by the overhead light switches 239*e*, 239*f*, the response inhibit switches 239*g*, 239*h*, and the stop button 239*i* are routed to all of the barrier operators 12, 12', 12", 12"' by the switch module controller 141. Similar to the wireless switch modules discussed previously, the barrier operators in the wired system maybe trained to respond to particular switch modules.

For all switch module configurations described above, including the wireless three and nine-button switch modules and the wired nine-button switch module, a given barrier operator is trained to recognize each transmitter that is to be used to control that barrier operator. It is through training that each head unit is able to learn the identity of the transmitter or transmitters on the switch module to which it will respond. As such, signals from other, non-learned, transmitters and switch modules will go ignored. It is to be noted that the barrier operators maybe trained such that the command switches control barriers operators other than those explicitly shown and described in exemplary embodiments herein. Further, each barrier operator maybe trained to respond to multiple switch modules.

During an installation of the barrier operators, each must be taught which transmitters and switch modules to which it will respond. First the barrier operator must be placed in a learn mode during which the barrier operator is taught the transmitters, switch modules and particular switches to which it will respond.

A first exemplary embodiment for entering the learn mode includes a learn button connected to the controller on the side or back of the head unit. When a given barrier operator is to be taught a switch of a switch module, the learn button of that operator is pressed and a switch such as the command switch of the switch module is pressed. The given barrier operator receives the resulting transmission from the switch module and "learns" it by storing the code portion of the received signal in memory. The learning process is repeated for each barrier operator so that it stores in memory a code representing each switch module button to which it is to respond. The process may then continue for others of the barrier operators until all have been trained, as discussed, by the installer.

It may be desirable that the barrier operators and their respective controllers are intended and configured specifically for operation with a preselected type of wired and wireless switch modules. This system provides an enhanced user experience by eliminating the need for individually teaching the controller each button of the switch module. To accomplish this, the controller memory in the barrier operator is programmed during production or installation with switch ID portions for the various switches of the switch modules. For example, the controller memory maybe programmed to include a table for storing the switch ID portions. When the barrier operator is placed into learn mode and the first switch on the switch module is pressed, the controller automatically learns the code for the switch module and the switch ID portions from the table, thereby eliminating the need to manually teach the controller each individual switch.

The switch modules as described above transmit only fixed switch module codes along with switch identities. For increased security, the present system may also be configured to operate using what is known as rolling codes. A rolling code system generally includes a transmitter having means for developing and transmitting a fixed code portion and a rolling or variable code portion. The fixed code portion includes the transmitter identifier (switch module code) based on the multiple trits described above for identifying the particular transmitter that transmitted the code. The rolling or variable code portion is changed with each actuation of the handheld transmitter and/or the switch module in accordance with a predetermined algorithm known to both transmitter and receiver. The fixed code remains the same for each actuation of the transmitter. The receivers, such as the barrier operators, in a rolling code system perform the same algorithm for predicting the rolling code for each transmission they receive from a transmitter they have learned. When the fixed code portion and rolling code portion of a received code match what is predicted, an operation is begun and an updated rolling code value is stored for future received code comparisons.

In the rolling code system, multiple handheld transmitters and the switch module maintain communication with the barrier movement operators even as rolling code values change through usage of the handheld transmitters and the switch module. The switch module of the present example stores one rolling code value which is used to calculate a next rolling code value for transmission when a transmission occurs. At the end of transmission the "next" rolling code value is stored by the switch module to use in computing a further "next" rolling code value. Such continues with the rolling code value stored by the switch module being updated for each transmission.

As above described, all barrier movement operators may not respond to all transmissions from the switch module. For example, if command button 139A is learned by barrier movement operator 12 only, the rolling code value of the switch module will be updated for each transmission and the rolling value of the barrier movement operator which responds to button 139A will also be updated. In order to maintain synchronism with the other barrier movement controllers which may have learned other buttons of the switch module it has been found advantageous to advance the rolling code values of all barrier movement operators with each transmission from the switch module, regardless of whether the barrier movement operator actually performs an operation in response to the transmission. This is true even if the controller has not learned the specific switch button of the switch module represented in the received code. As such, each barrier operator is able to maintain a generally current roll value to enable communication with the switch module, even though it may not have been actuated recently by the switch module. It is to be noted that although all the controllers that detect a match with the switch module code increase their roll counts, only the particular controller or controllers trained specifically to the particular button being pressed execute the command function. And, as mentioned above, controllers that are not trained to the switch module transmitting the signal do not increment their roll counts because they do not recognize the switch module.

Figure 5:
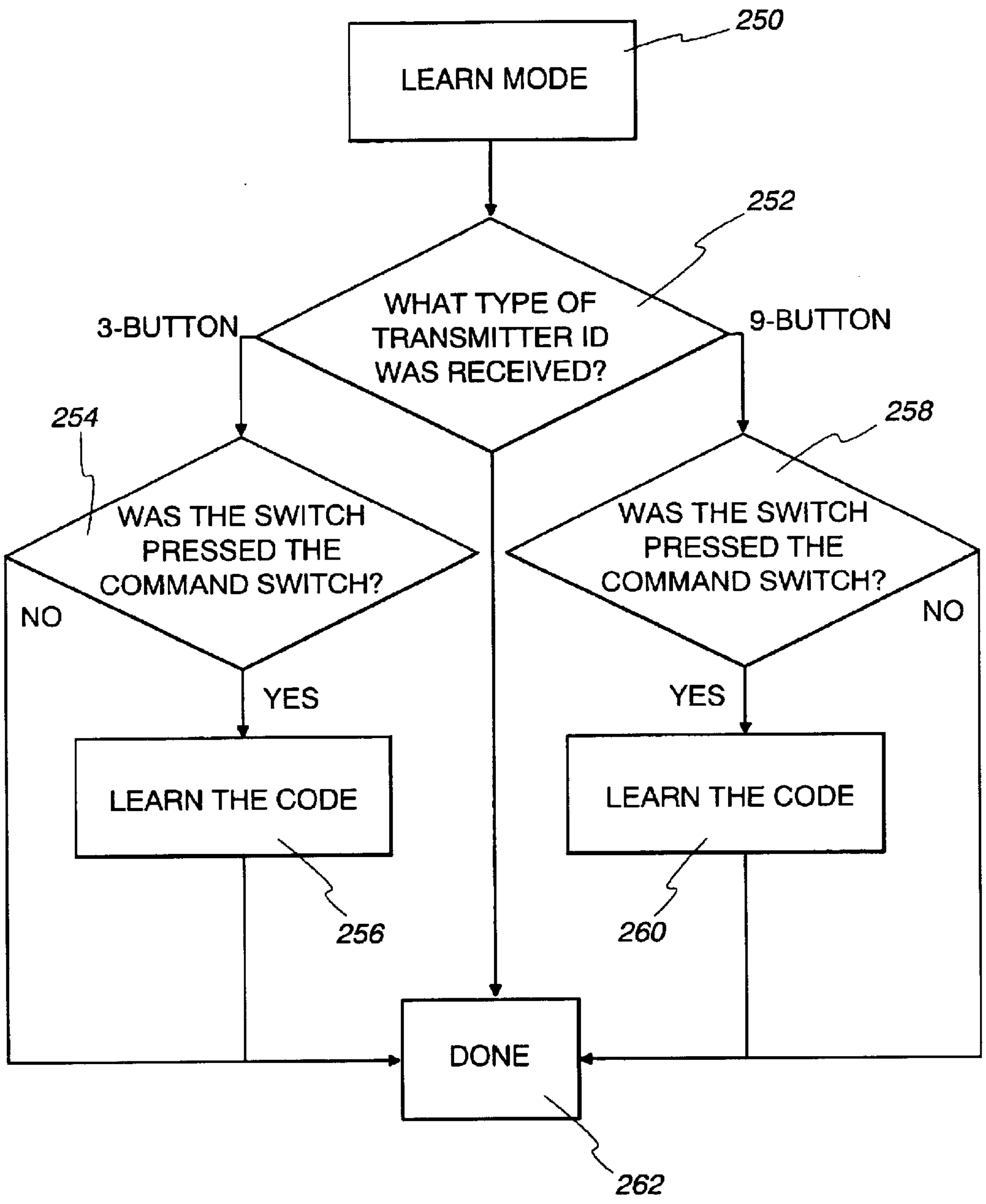
FIG. 5 is a flow diagram of a learn mode of the controller to learn the code of a switch module.

Referring to FIG. 5, the procedure used in programming the three and nine-button switch modules is shown. In step 250, the controller is placed into learn mode. In step 252, the controller determines the particular switch module type from which learn mode was initiated. In this manner, it is determined whether the switch module is a nine-button switch module or a three-button switch module.

If a signal is received from the three-button switch while the controller is in learn mode, the system determines in step 254 whether the command switch was pressed. If so, the controller learns the code for the three-button switch module in step 256. The controller exits learn mode in step 262. The controller moves directly to step 262 and exits learn mode if the command switch was not pressed in step 254.

When it is determined in step 252 that the nine-button switch module is transmitting, the system checks in step 258 whether the command switch was pressed subsequently. If so, the controller learns the switch module code for the nine-button switch module in step 260 and exits learn mode in step 262. If the command switch was not pressed in step 258, then the controller immediately exits learn mode in step 262. In the case of either the three-button switch module or the nine-button switch module having originated the code, the value of the code is saved in the NVRAM.

Figure 6:
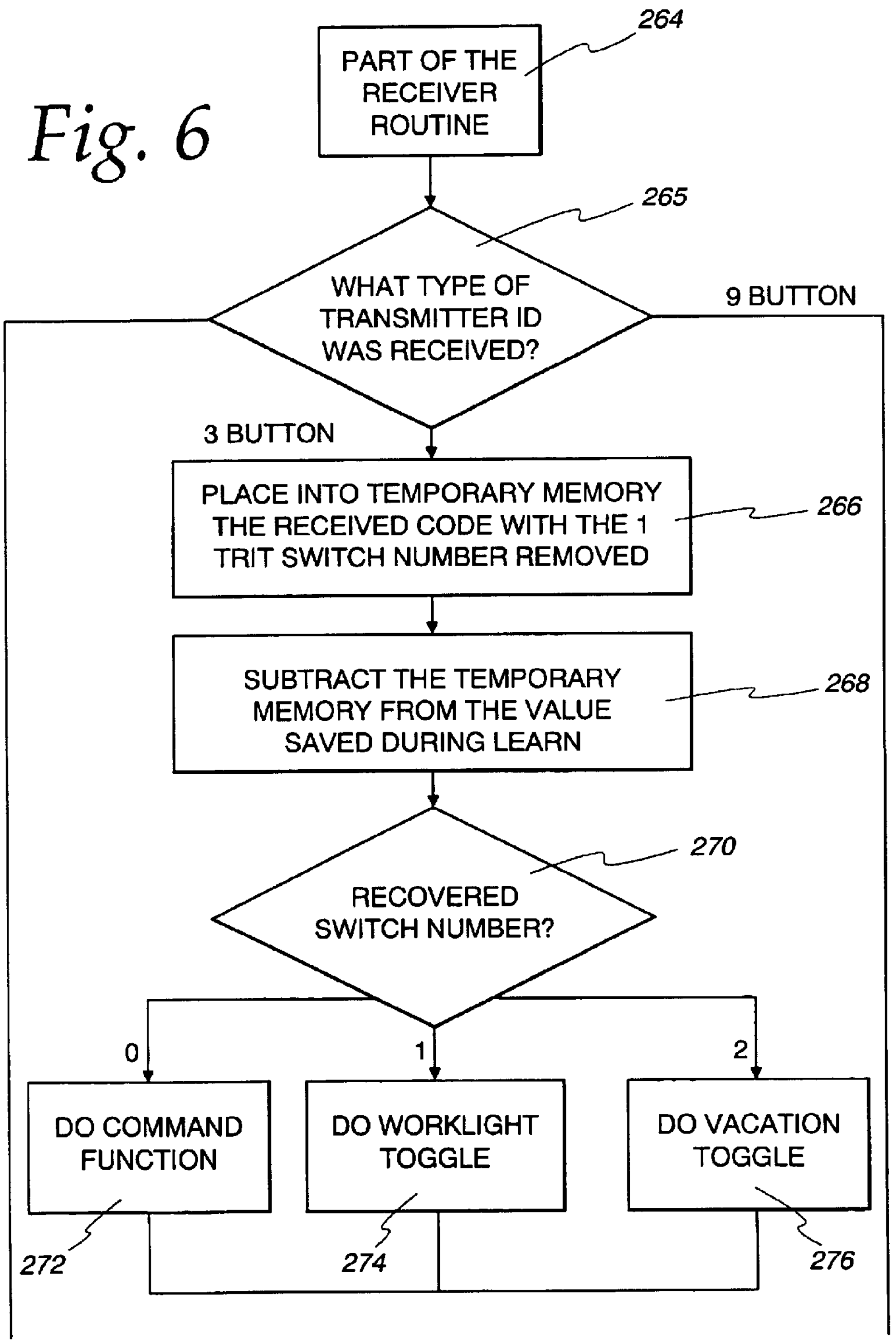
FIG. 6 is a flow diagram of a receiver routine for operating the controller based on the identity of the switch.
Figure 7:
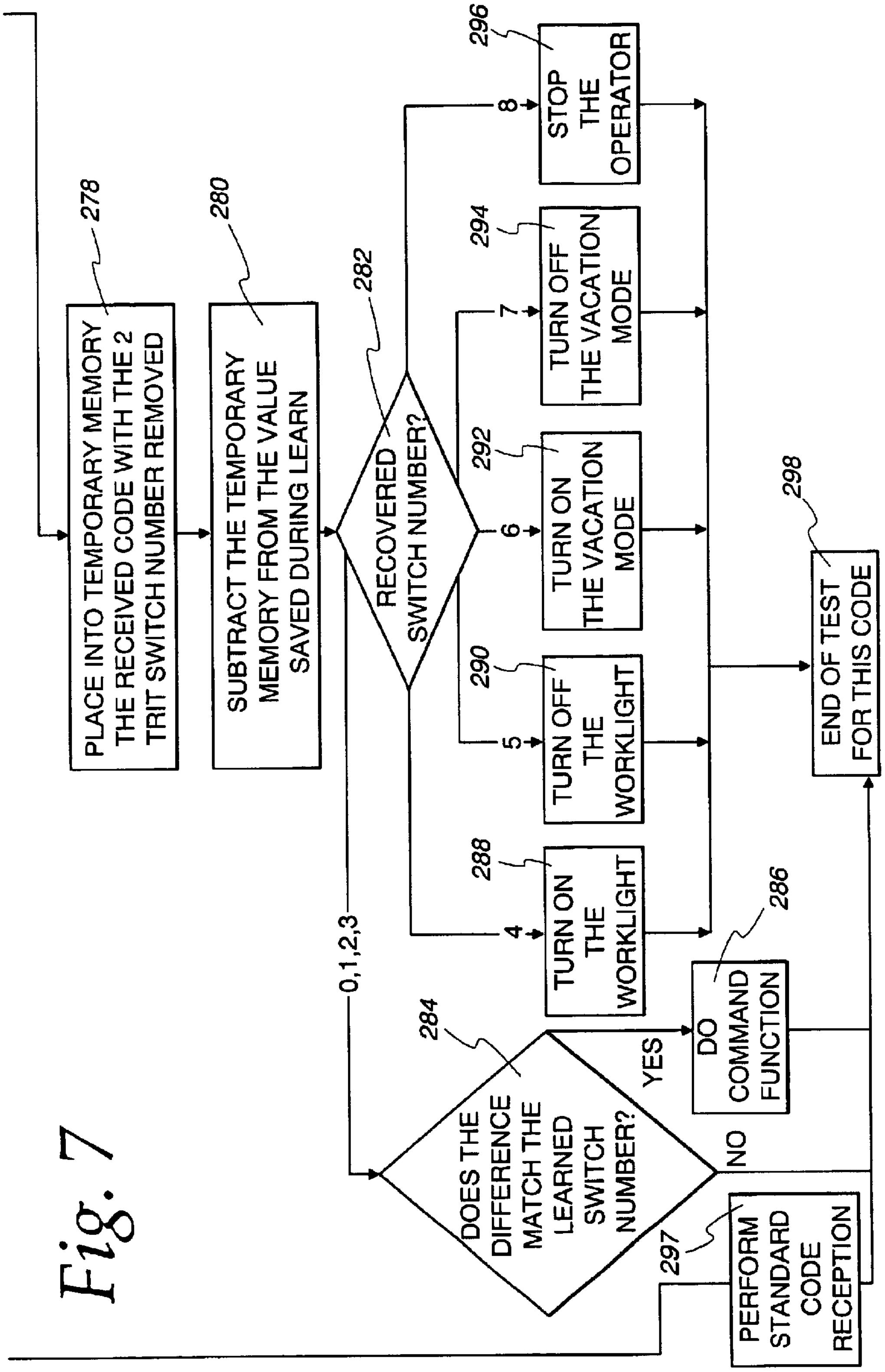
FIG. 7 is a continuation of the flow diagram of FIG. 6.

FIGS. 6 and 7 show the operation of the barrier movement operator in response to received signals. In step 264 the receiver in the controller receives the radio transmission and code from either the three-button switch module or the nine-button switch module. In step 265, in a manner similar to that described during the learn operation, the receiver determines the identity of the switch module that transmitted the code. If the three-button switch module transmitted the code, the received code minus the value of the first trinary bit switch number is placed into a temporary scratchpad memory in the receiver in step 266. In step 268, the temporary memory value is subtracted from the value saved in the non-volatile memory during the learn procedure, as describe above. This results in recovering in step 270 the identity of the particular switch that was pressed on the switch module. Based upon the identity of the recovered switch number in step 270, the barrier operator executes the appropriate operation. For example, if the command switch is pressed, then in step 272 the barrier is set into motion. If the second switch is pressed, then the barrier operator light is toggled in step 274. If a press of the third switch is detected, response inhibit mode is toggled in step 276. Upon completion of one of the above operations, the receiver routine ends in step 298.

If in step 265 it is determined that the nine-button switch module transmitted the code, the received code minus the value of the second trinary bit switch number is placed into the temporary scratchpad memory in the receiver in step 278. In step 280, the temporary memory value is subtracted from the value saved in the non-volatile memory during the learn procedure, as describe above. This results in recovering in step 282 the identity of the particular switch that was pressed on the nine-button switch module.

Based upon the identity of the recovered switch number in step 282, the barrier operator executes the appropriate operation. For example, if one of the command switches was pressed, then in step 284 the particular command switch that was pressed is determined. The command function is executed in step 286 to enable the barrier movement operator associated with the particular pressed switch to operate. If the fifth switch was pressed, then the barrier operator lights for all the barrier movement operators are turned on in step 288. If the sixth switch was pressed, then the barrier operator lights are turned off for all barrier movement operators in step 290. If a press of the seventh switch was detected, response inhibit mode is activated for all of the barrier movement operators in step 292. If the eighth switch was pressed, response inhibit mode is deactivated in step 294 for all the barrier movement operators. In another embodiment, the nine-button switch module includes a ninth switch for stopping barrier operators. If the ninth switch is pressed, then barrier movement in any direction is stopped for all the barrier movement operators. Upon completion of one of the above operations, the receiver routine ends in step 298.

If in step 265, if it was determined that the received code was not transmitted by either the three-button switch module or the nine-button switch module, then the controller performs in step 297 a routine type of reception for codes from transmitters such as the handheld transmitter 30, which is known in the art.

In the preceding embodiments, each of a plurality of barrier movement operators was trained to respond to a separate command button, e.g. 139*a*–139*d* (FIG. 4). At the time of installation, various groups or subsets of the barrier movement operators can be taught the same command button so that a single command button may control multiple barriers. For example, when four barriers are present, the first and third operators maybe taught during learning modes for those operators to respond to command button 139*a* while the second is taught to respond to command button 139*b* and the fourth taught to respond to command button 139*c*.

In the rolling code system described above, when initiating a learn mode through the press of two buttons, two signal transmissions are made. Each transmission corresponds to the ID of the buttons being pressed. However, when two buttons are pressed relatively simultaneously, the roll code does not change. As such, the barrier movement operators detect that two buttons were pressed without a change in the roll code and interprets this as a simultaneous button press intended to initiate learn mode.

As a convenience feature, when the barrier movement operator is placed in learn mode, to indicate to the user that the controller is in learn mode the overhead light maybe blinked or an indicator, such as an LED, maybe lit. Alternatively, the controller maybe fitted with either a piezoelectric speaker or some other noise making device to sound an audible alert for indicating the system is in learn mode.

The appendix attached hereto includes a source code listing of a series of routines executed by the processors in their respective switch modules.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for controlling a plurality of barrier movement operators, comprising:

a plurality of barrier operators, each comprising a source of motor powering voltage, a motor and a controller responsive to barrier control signals for connecting the motor powering voltage to the motor for controlling the position of a respective barrier;

a wall control unit responsive to user interaction for transmitting to the plurality of controllers, a plurality of barrier control signals comprising a first control signal for directing barrier position control by one of said barrier operators and a second control signal for directing barrier control by more than one of the barrier operators and the controllers of the barrier operators respond to the first and second control signals by selectively connecting motor powering voltage to the associated motor.

2. The system of claim 1, wherein the first and second barrier control signals comprise radio frequency transmissions.

3. The system of claim 1, wherein the first and second barrier control signals comprise coded signals.

4. The system of claim 3, wherein each barrier operator comprises a controller for learning coded signals.

5. The system of claim 3, wherein the coded signals comprise rolling code signals.

6. The system of claim 5, wherein each barrier operator comprises a controller for learning rolling code signals.

7. The system of claim 6, wherein the controller includes an operating mode for recognizing previously learned rolling code signals.

8. The system of claim 1, wherein the wall control unit transmits the barrier control signals over a wired connection between the wall control unit and the barrier operator.

9. The system of claim 8, wherein the wall control unit includes a signal decoder to determine the identity of the barrier operator intended to receive the barrier control signal and for routing the control signal to the determined barrier operator.

10. The system of claim 8 wherein the wall control unit comprises a switch module controller for routing each barrier control signal to the ones of the plurality of barrier operators for which the barrier control signal is intended.

11. The system of claim 1, further comprising a passive infrared detector for detecting movement within a predetermined area.

12. The system of claim 11, wherein the passive detector communicates wirelessly with one or more of the barrier operators.

13. The system of claim 11, wherein an overhead light is illuminated upon the passive infrared detector identifying movement.

14. The system of claim 1, wherein the wall control unit at least two buttons that when pressed substantially simultaneously activate additional functions of one or more barrier operators.

15. The system of claim 14, wherein an additional function is illumination of an overhead light.

16. The system of claim 14, wherein an additional function is activation of response inhibit mode.

17. The system of claim 14, wherein the additional function is activation of a learn mode by one or more barrier operators.

18. The system of claim 17, more than one barrier controller updates a learned rolling code in response to signal transmitted from the wall control unit.

19. The system of claim 14, wherein in a rolling code system, the wall control responds to the pressing of two buttons that substantially simultaneously transmits two signals indicative of the identities of the buttons without the roll code.

20. The system of claim 1, wherein the wall control unit further comprises a universal stop button for directing the controllers of all of the barrier movement operators to cease movement of their respective barriers.

21. The system of claim 1, further comprising a handheld transmitter for controlling barrier movement operation.

22. The system of claim 1 wherein the first and second barrier control signals comprise wireless signals encoded as rolling code signals and the controllers of all barrier operators respond to all barrier control signals by updating a rolling code comparison value regardless of whether or not they control barrier position in response to the barrier control signal.

* * * * *